Patented Nov. 27, 1934

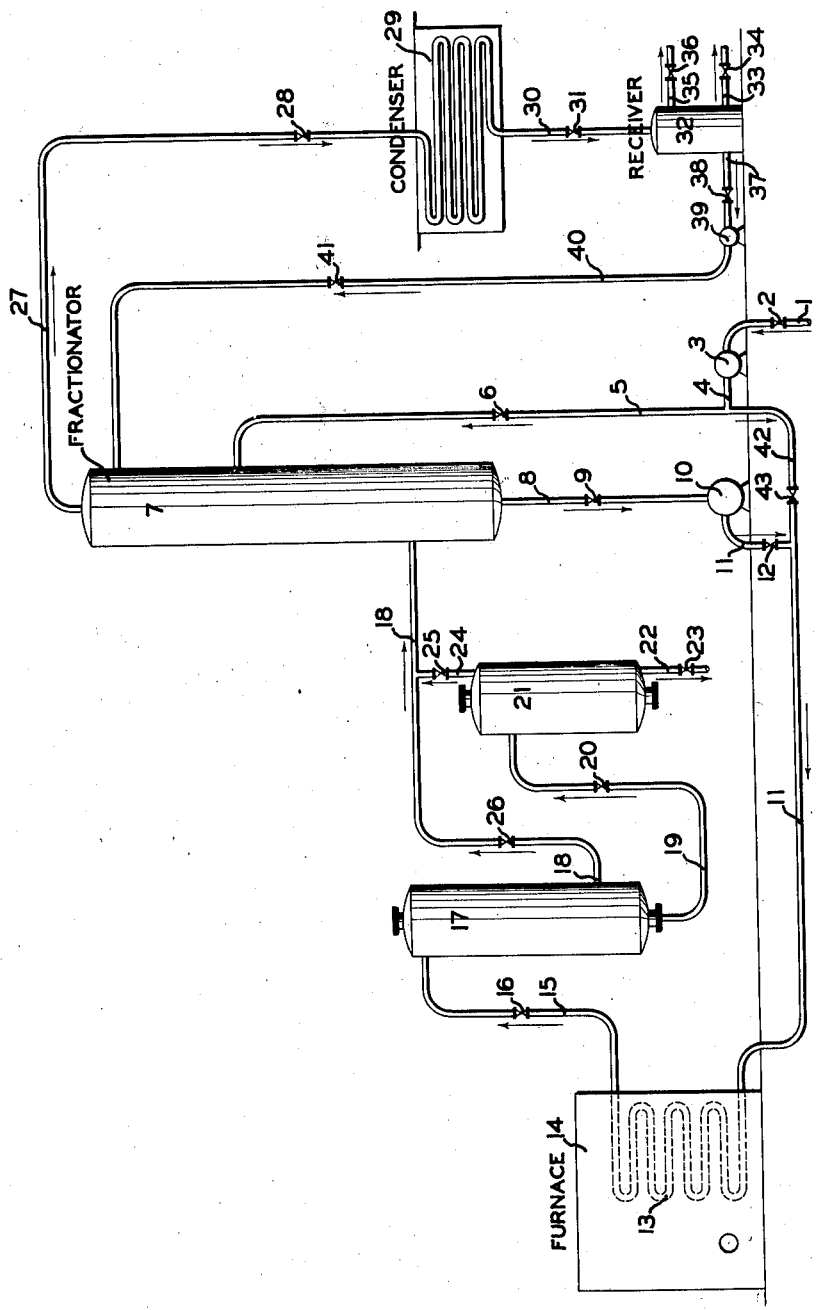

1,982,462

UNITED STATES PATENT OFFICE 1,982,462

HYDROCARBON OIL CONVERSION

Joseph G. Alther, Chicago, Ill., assignor to Universal Oil Products Company, Chicago, Ill., a corporation of South Dakota Application December 13, 1930, Serial No. 502,028

3 Claims. (Cl. 196—48)

This invention relates to the conversion of hydrocarbon oils and particularly refers to the conversion of relatively heavy oils into lighter and more valuable products.

In one embodiment, the present invention comprises heating hydrocarbon oil to a conversion temperature, introducing the heated oil into an enlarged reaction zone, separately removing vapors and liquid from said enlarged reaction zone, subjecting the liquid to further treatment in a vaporizing zone and combining vapors withdrawn from the first reaction zone with vapors evolved in and withdrawn from the vaporizing zone. The vapors may be subjected to further treatment, such as fractionation followed by condensation and collection of the lighter components of the vapors and their heavier condensed portion may be returned to the heating element for reconversion.

As a feature of the present invention, vapors withdrawn from the reaction chamber may be removed therefrom at a point remote from the point of introduction of the heated products into the chamber, thus subjecting the vapors to prolonged reaction in the first chamber for a predetermined length of time, depending, in part, upon the size of the chamber and the relative position of the point of withdrawal of the vapors to the point of entrance of heated products into the chamber.

It is evident from the foregoing, that by the provisions of the present invention quick separation of vapors and liquid may be accomplished in the reaction zone and the arrangement may be such that the vapors may be subjected to a prolonged reaction time independent of the total time afforded for treatment of the liquid. The liquid after being withdrawn from the reaction zone, may be subjected to further treatment in a separate zone under substantially the same or, if desired, under milder conditions than those maintained in the reaction zone.

The novelty and advantageous features of the present invention will be more apparent from the accompanying diagrammatic drawing and the following detail description thereof which embodies also a description of the process of the present invention.

Referring in detail to the drawing, raw oil supplied through line 1 and valve 2 to pump 3 may be fed through line 4, line 5 and valve 6 to fractionator 7 where it may be preheated by contact with the vapors in this zone. Said preheating may assist in the fractionation of the vapors and said preheated charging stock passing together with the condensed heavy components of the vapors through line 8 and valve 9 to pump 10 may be passed as a combined feed through line 11 and valve 12 to heating element 13. A portion or all of the raw oil may, if desired, be diverted from fractionator 7 and passed directly into line 12 through line 42 and valve 43 to heating element 13, combining in line 12 with reflux condensate from fractionator 7 and that portion, if any, of the raw oil fed overhead to this zone.

Heating element 13 may be disposed in any suitable form of furnace 14 and the oil passing therethrough may be subjected to the desired conversion temperature under any desired pressure conditions and passes through line 15 and valve 16 into reaction chamber 17, entering, in the particular case illustrated, at a point near the top of the chamber. Separation of vapors and liquid may occur in chamber 17, vapors being withdrawn through line 18 disposed, in this case, at a point in the lower portion of the chamber.

Liquid may be withdrawn from chamber 17 through line 19 and valve 20 to vaporizing chamber 21, which may be maintained under substantially the same pressure as that utilized in chamber 17, or may be maintained under reduced pressure relative thereto. If desired, reduced pressure may be employed in chamber 21 to effect further vaporization of the liquid from chamber 17 introduced thereto. Liquid remaining unvaporized in chamber 21 may be withdrawn from the system to further treatment or to storage through line 22 and valve 23. Vapors evolved from chamber 21 may pass through line 24 and valve 25 into line 18 combining therein with vapors from chamber 17 withdrawn through line 18 and valve 26.

Combined vapors from chambers 17 and 21 may be subjected to fractionation in fractionator 7, their heavier components being condensed and returned to reconversion, as already described, while their lighter components pass as vapors through line 27 and valve 28, are subjected to condensation and cooling in condenser 29, uncondensed vapors and liquid from which pass through line 30 and valve 31 to be collected in receiver 32. Distillate may be withdrawn from receiver 32 through line 33 and valve 34 while uncondensable gas may be released through line 35, controlled by valve 36. A portion of the distillate from receiver 32 may be withdrawn through line 37 and valve 38 and recirculated by means of pump 39 through line 40 and valve 41 to fractionator 7 where it assists fractionation of the vapors.

Pressures employed within the system may range from subatmospheric to superatmospheric pressures as high as 1500 pounds or more per square inch. Substantially equalized pressure may be maintained throughout the system but, if desired, the pressure in the vaporizing chamber may be reduced below that employed in the reaction chamber while the reaction chamber may be maintained under substantially the same or under reduced pressure relative to that employed in the heating element. The fractionating, condensing and collecting equipment is preferably maintained under substantially the same or under a lower pressure than that employed in the vaporizing chamber. Conversion temperatures ranging from 750 to 1200° F., more or less, may be employed.

As a specific example of certain operating conditions which may be employed in the system illustrated and results which may be obtained therefrom; operating with a 28° A. P. I. gravity Mid-Continent topped crude as charging stock it is subjected, together with reflux condensate from the system, to a temperature of approximately 950° F. A pressure of approximately 350 pounds per square inch is maintained upon the heating element and the reaction chamber while the vaporizing chamber and succeeding parts of the system are maintained under a substantially equalized pressure of approximately 50 pounds per square inch. An operation of this character may yield some 54% of motor fuel having an anti-knock value equivalent to a blend of 55% benzol and 45% straight-run Pennsylvania gasoline. In addition, about 16% of pressure distillate bottoms is produced and about 22% of residual oil is obtained, having characteristics which render it suitable for sale as fuel. No substantial amount of coke is produced, the remaining 8% or thereabouts being chargeable principally to gas and loss.

In another case a 44–46 A. P. I. gravity Pennsylvania distillate was treated at a temperature of approximately 955° F. and a pressure of approximately 350 pounds per square inch on the heating element and the reaction chamber and a pressure of approximately 50 pounds per square inch on the vaporization chamber with equalized pressures on the fractionating column, condenser and receiver.

A yield of approximately 70% of gasoline was obtained with a benzol equivalent of 65%, i. e. equivalent in anti-knock properties to a mixture of straight run gasoline and benzol containing 65% of the latter. Approximately 8% of fuel oil was obtained in addition to a rich gas.

It is to be understood, of course, that the examples given herein are for purposes of illustration and are not intended as a limitation of my invention.

I claim as my invention:

1. A hydrocarbon oil cracking process which comprises passing the oil in a restricted stream through a heating zone and heating the same therein to cracking temperature under pressure, discharging the heated oil directly from the heating zone into the upper portion of an enlarged vertical reaction zone and passing both vapors and unvaporized oil downwardly through the reaction zone, separating vapors from unvaporized oil in the reaction zone and removing the separated vapors from the lower portion of the reaction zone, separately removing the unvaporized oil from the lower portion of the reaction zone and passing the same without admixture with said vapors to a second enlarged zone wherein further separation of vapors is effected, dephlegmating the vapors removed from said vertical zone and the vapors separated in said second zone to condense heavier fractions thereof, and returning resultant reflux condensate to the heating zone, and finally condensing the dephlegmated vapors.

2. A hydrocarbon oil cracking process which comprises passing the oil in a restricted stream through a heating zone and heating the same therein to cracking temperature under pressure, discharging the heated oil directly from the heating zone into the upper portion of an enlarged vertical reaction zone and passing both vapors and unvaporized oil downwardly through the reaction zone, separating vapors from unvaporized oil in the reaction zone and removing the separated vapors from the lower portion of the reaction zone, separately removing the unvaporized oil from the lower portion of the reaction zone and passing the same without admixture with said vapors to a second enlarged zone wherein further separation of vapors is effected, combining the last mentioned vapors with said separated vapors and dephlegmating the mixture to condense insufficiently cracked fractions thereof, returning resultant reflux condensate to the heating zone for recycling through the process, and finally condensing the dephlegmated vapors.

3. A hydrocarbon oil cracking process which comprises passing the oil in a restricted stream through a heating zone and heating the same therein to cracking temperature under pressure, discharging the heated oil directly from the heating zone into the upper portion of an enlarged vertical reaction zone and passing both vapors and unvaporized oil downwardly through the reaction zone, separating vapors from unvaporized oil in the reaction zone and removing the separated vapors from the lower portion of the reaction zone, separately removing the unvaporized oil from the lower portion of the reaction zone and passing the same without admixture with said vapors to a second enlarged zone, wherein further separation of vapors is effected, maintaining said second enlarged zone under lower pressure than said vertical reaction zone whereby the unvaporized oil is flash distilled therein by pressure reduction, dephlegmating the vapors removed from said vertical zone and the vapors separated in said second zone to condense heavier fractions thereof and returning resultant reflux condensate to the heating zone, and finally condensing the dephlegmated vapors.

JOSEPH G. ALTHER.